March 27, 1934. E. B. THOMPSON 1,952,480
HAND SIGNAL
Filed Oct. 17, 1930
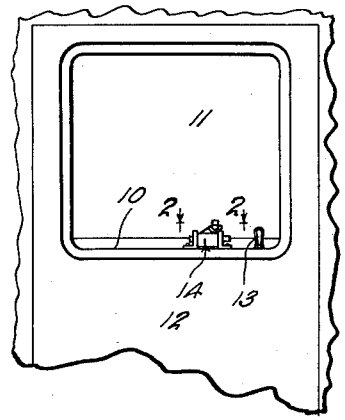
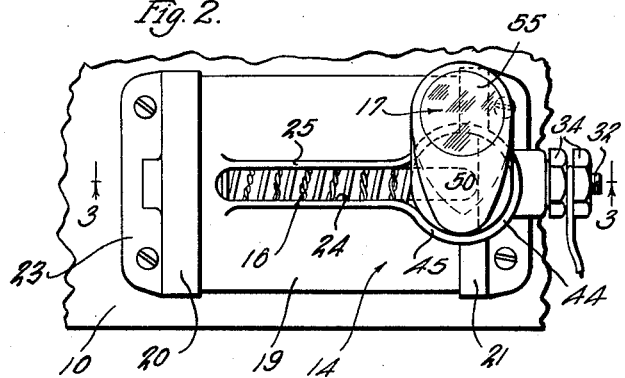
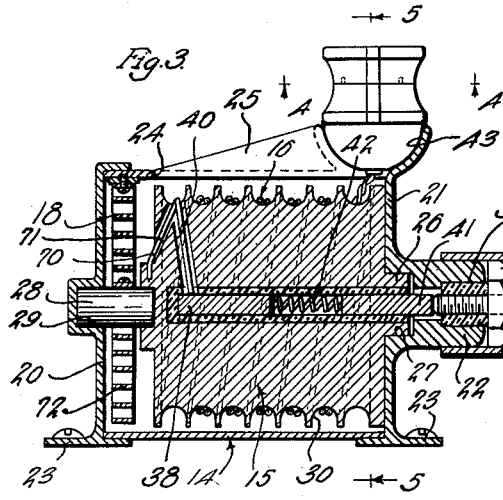
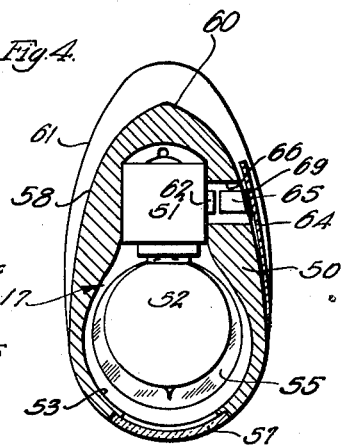
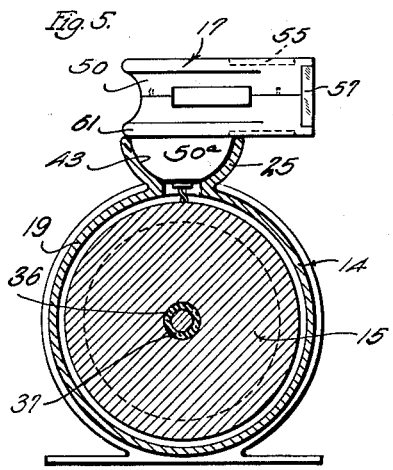
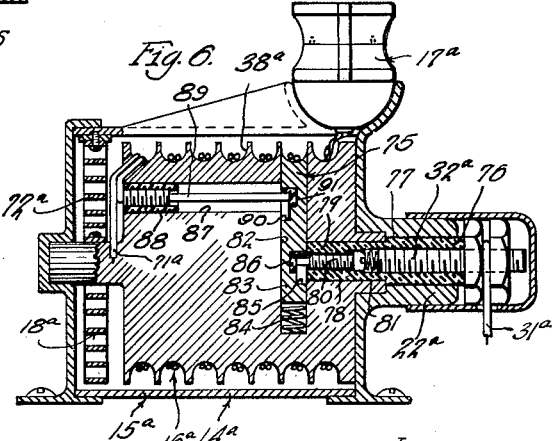
INVENTOR
EDMUND B. THOMPSON
BY
HIS ATTORNEY Patented Mar. 27, 1934

1,952,480

UNITED STATES PATENT OFFICE 1,952,480

HAND SIGNAL

Edmund B. Thompson, Los Angeles, Calif.

Application October 17, 1930, Serial No. 489,323

3 Claims. (Cl. 177—329)

This invention relates to a hand signal and relates more particularly to a signalling device for use on an automobile, or the like.

When the driver of an automobile, or like vehicle, signals with his hand, it often occurs that his signal is not visible to the drivers of other vehicles on the road. This is particularly true at night, when the glare of the headlights of passing vehicles, or other vehicles on the road, make it very difficult to see a traffic signal made by the hand.

It is a general object of the invention to provide a practical and effective signalling device for use by a motorist or operator of a vehicle.

It is another object of the invention to provide a signalling device of the character mentioned that embodies a light or lamp adapted to be readily grasped and held in the hand of the driver of the vehicle.

It is a further object of the invention to provide a signalling device that embodies an illuminating means or light that may be conveniently grasped by the driver of a vehicle when making a signal.

It is a further object of the invention to provide a signalling device that may be mounted in a convenient position on a vehicle, for example, at a window of the vehicle, and carries a signal light or lamp in a position where it may be quickly and easily engaged and grasped by the driver when he thrusts his hand through the window to make a signal.

It is a further object of the invention to provide a signalling device of the character mentioned, in which the signal lamp is automatically returned to and held in a socket in the body of the device after it has been used.

It is a further object of the invention to provide a signalling device of the character mentioned that embodies a signal lamp shaped so as to be quickly and conveniently gripped between two fingers and which is provided with a switch which may be operated by a slight pressure of the fingers.

It is another object of the invention to provide a signalling device of the character mentioned that may be constructed so the lamp is automatically lighted upon the lamp being moved or handled by the operator.

It is a further object of the invention to provide a signalling device of the character mentioned that is simple and inexpensive of manufacture and which may be constructed in the form of an accessory that may be mounted on vehicles of various characters.

Various other objects and features of the invention will be readily apparent from the following detailed description of typical preferred forms of the invention, throughout which description reference may be had to the accompanying drawing, in which:

Fig. 1 is a side view of a portion of a vehicle illustrating the device provided by this invention mounted on the sill or ledge of a window in the vehicle. Fig. 2 is an enlarged top or plan view of one form of the device, being a view taken as indicated by line 2—2 on Fig. 1. Fig. 3 is a vertical detailed sectional view taken as indicated by line 3—3 on Fig. 2. Fig. 4 is an enlarged horizontal detailed sectional view of the signal lamp embodied in the present invention taken as indicated by line 4—4 on Fig. 3. Fig. 5 is a vertical detailed sectional view taken substantially as indicated by line 5—5 on Fig. 3. Fig. 6 is a longitudinal detailed sectional view of another form of the invention.

The device provided by the present invention is adapted to be mounted on a vehicle in a position where it is readily accessible to the driver or an occupant of the vehicle. The device is adapted to be used in connection with vehicles of various characters and may be mounted in any suitable location on a vehicle. Throughout the following detailed description of the invention, it will be disclosed as arranged on the lower sill 10 of a window 11 in a vehicle door 12. In the particular vehicle construction illustrated, a handle 13 for operating a latch of the door 12 projects upwardly from the sill 10. It is to be understood that the invention is not to be construed as limited to the particular use or form illustrated in the drawing, but that it is to be taken as including any features or modifications that may fall within the scope of the claims.

The form of the present invention, illustrated in Figures 2 to 5 inclusive of the drawing, includes, generally, a body or housing 14 adapted to be mounted on the sill 10, a reel 15 rotatably mounted within the housing 14, an electrical conductor or conduit 16 wound on the reel 15, a signal light or lamp 17 normally removably supported on the housing 14 and attached to the electrical conduit 16, and means 18 for normally yieldingly retaining the lamp 17 in its normal position on the housing 14 and for automatically winding the conduit 16 onto the reel 15 after the lamp 17 has been used.

The body or housing 14 is provided to carry or encase the reel 15 and to normally support the signal lamp 17. In accordance with the invention, the housing 14 may be designed for mounting on variously shaped parts of vehicles, etc. In the particular form of the invention illustrated in the drawing, the housing 14 is adapted to be mounted on a substantially horizontal flat part, such as the sill 10, and includes a cylindrical tubular main part 19. The tubular part 19 of the housing may be horizontally disposed and may be arranged longitudinally of the sill 10. An end plate 20 closes one end of the part 10 and an end plate 21 closes the opposite end of the part 19. The end plate 21, which I will term the rear end plate, is provided with a central outwardly projected boss 22. Substantially horizontal flanges 23 are provided at the lower edges of the end plates 20 and 21 to mount the device on the sill 10 or other part of a vehicle. An elongated longitudinally extending opening or slot 24 is provided in the walls of the housing part 19. The slot 24 is provided to pass the conduit 16 and is preferably provided in the top or upper portion of the part 19. Upwardly projecting flanges 25 may be provided along the edges of the slot 24. The upper edges of the flanges 25 may be inclined upwardly and rearwardly as illustrated in Fig. 3 of the drawing.

The reel 15 is rotatably mounted within the housing 14 and is provided to carry the conduit 16. The reel 15 is provided at its rear end with a central hub 26 extending into and rotatably carried in a socket 27 in the end plate 21. A trunnion or stub shaft 28 may be provided at the forward end of the reel to extend into a socket 29 formed in the end plate 20. A continuous helical or spiral groove 30 is provided on the reel 15 for carrying the conduit 16.

The electrical conduit 16 is embodied in the means for supplying current to the lamp 17 and is normally wound on the reel 15. The conduit 16 may be formed of a wire covered with suitable insulating material and one end of the conduit extends into the lamp 17, while its other end is electrically connected with a line or wire 31, connected with a suitable source of power on the vehicle. The means for electrically connecting the line or conduit 16 with the wire 31 includes a contact or stem 32, screw-threaded through a body 33 of insulating material carried in the boss 22. The stem 32 projects from the outer end of the boss 22, and the line or wire 31 may be connected with the stem 32 in any similar manner. In the particular case illustrated, nuts 34 are screw-threaded on the stem 32 to clamp the wire 31 in position on the stem. A suitable insulating cap 35 of rubber, or the like, may be provided on the boss 22 to extend over the stem 32 and encase the nuts 34.

A central longitudinal opening 36 is provided in the reel 15. The opening 36 is closed at its forward end. A tubular insulator 37 is arranged in the opening 36. The insulator 37 may be force-fitted into the opening 36 so as to rotate with the reel. The forward end of the insulator 37 is preferably closed. A contact bar 38 is arranged in the inner or forward end of the insulator 37 and is force-fitted into the insulator or rigidly connected with the insulator in any suitable manner. An end of the electrical conduit 16 extends through an opening 40 in the reel and is connected with the bar 38. A contact bar 41 is provided in the outer or rear portion of the insulator 37. The bar 41 may be freely rotatable and slidable in the insulator and projects from its end to engage or contact with the stem 32. The inner end of the stem 32, which engages the bar 41, may be beveled or rounded. A helical spring 42 is arranged under compression between the bars 38 and 41 to electrically connect the bars and to retain the bar 41 in effective electrical engagement with the stem 32.

The signal light or lamp 17 is normally seated in a socket 43 in the upper side of the housing 14. The socket 43 is shaped to effectively carry the lamp and is located so that the lamp is readily accessible to the driver of the vehicle. In the preferred form of the invention, the socket 43 is provided at the top of the housing 14 adjacent its rear end. In the particular embodiment of the invention illustrated in the drawing, the socket 43 is formed by a substantially semi-circular flange 44 projecting upwardly from the end plate 21 and curved extensions 45 on the flanges 44. The extensions 45 join or abut the semi-circular flange 44, and the extensions 45 and the flange 44 form a substantially round socket communicating with or opening into the slot 24. The bottom walls of the socket 43 are rounded and concaved, as illustrated throughout the drawing, and the slot 43 terminates at approximately center of the bottom of the socket.

The lamp shell 50 is sectional, including an upper section and a lower section. A rounded bottom part or projection 50ª is provided on the lower section of the shell to seat in the socket 43. The two sections of the shell are provided with complementary sockets which provide a chamber 53 in the shell. The chamber is provided to carry an electric light or bulb 52. A suitable lamp socket 51 is mounted in a reduced end part of the chamber 53 to carry the electric lamp 52. The projection 50ª may be provided adjacent one end of the shell 50 so that the shell projects beyond the socket 43. Suitable lenses 55 are provided in the upper and lower sides of the chamber 53. A lens 57 may be provided in the outer end of the chamber 53. The lenses 55 and 57 may be suitably colored glass, or the like, for example, they may be red glass.

In accordance with the invention, the shell 50 of the lamp is shaped so that it may be readily gripped or held between two fingers of one hand of an occupant of the vehicle, for example, it may be readily gripped between the extended first and second fingers, or between the extended second and third fingers of one hand. The side walls of the shell 50 are provided with the tapered or outwardly divergent portions 58, which diverge outwardly from the inner end of the shell to its outer end. The inner end of the shell 50 may be curved or rounded, as at 60 in the drawing, to effectively guide two fingers into position around the lamp. Flanges 61 are provided at the upper and lower edges of the finger receiving portions 58. It will be apparent how two straightened or extended fingers may be arranged on the divergent portions 58 of the lamp between the flanges 61.

The present invention provides a novel switch or contact device whereby the operator or motorist may turn on or operate the lamp 52 at will when holding the lamp 17. The lamp socket 51 is illustrated as having a post or contact 62. A resilient contact arm 64 is provided on the shell 50 for engaging or contacting with the contact 62. In accordance with the preferred form of the invention, the arm 64 is provided on a divergent wall 58 of the shell. The arm 64 carries a contact 65 extending through an opening 66 in the shell 50. The contact 65 is normally spaced from the post 62. The arm 64, being provided on one of the diverging walls 58 of the sill, may be readily pressed inward by slight pressure of the fingers. The wire or conduit 16 is attached to the contact 65 on the inner side of the arm 64. The contact 65 is adapted to be brought into engagement with the contact 62 upon inward flexing of the arm 64 and may be insulated from the arm by a body of insulating material 69.

A ground wire 70 is connected with the lamp socket 51. The wire or conduit 16 and the wire 70 may extend through an opening in the bottom of the shell 50 and may be wrapped or twisted together so that they may be wound on the reel 15 as a single line or element. The ground wire 70 has an end grounded or attached to the reel 15. In the particular case illustrated, the ground wire 70 extends through an opening 71 in the reel and is attached or grounded to the reel adjacent its forward end.

The means 18, for normally yieldingly retaining the lamp 17 in the socket 43 and for returning the lamp to the socket after use, is in the nature of a spring means acting through the reel 15 to normally keep the wires 16 and 70 wound on the reel. The means 18 may include a spiral spring 72 arranged within the housing 14. The spring 72 is in the nature of a torsional spring and surrounds the shaft 28. One end of the spiral spring 72 may be attached to the inner wall of the housing 14 and the other end of the spring may be secured to the shaft 28. It will be apparent how the spring 72 is put under a torsional strain when the lamp 17 is removed from the housing 14 and the wires 16 and 70 are unwound from the reel, and how it acts to rewind the wires on the reel when the lamp 17 is released or replaced in the socket 43.

It is believed that the utility and operation of the form of the present invention described above will be readily apparent from the foregoing detailed description. The housing 14 may be mounted on a sill 10 or other suitable part of the vehicle where the lamp 17 is readily accessible to the motorist or an occupant of the vehicle. The housing 14 is preferably arranged with the curved end 60 of the housing inward, so that the motorist may easily extend his hand to a position where the divergent portions 58 of the shell will extend between two of his fingers. The lamp 17 may be easily operated to the desired position when making a signal. It is to be noted that the lenses 55 will face forwardly and rearwardly and that the lens 51 will face outwardly when the hand is in position to make a signal, so that the signal may be seen by those in front and at the rear of the vehicle, as well as by those at the left of the vehicle. The spring 72 acts to rewind the lines 16 and 70 onto the reel 15 when the lamp 17 is released or returned to the socket 43. The switch arm 43 is formed and positioned so that it may be easily operated and controlled when the lamp is engaged or held by the motorist. The lamp 17 may be proportioned so as to be conveniently gripped and operated.

In the form of the invention illustrated in Figure 6 of the drawing, the housing 14$^a$, the reel 15$^a$, the lamp 17$^a$, and the means 18$^a$ for automatically rewinding the electrical conductor 16$^a$ upon the reel may be of the same construction as the corresponding parts or elements of the form of the invention just described. The form of the invention shown in Fig. 6 includes a means 75 for automatically delivering electric current to the lamp 17$^a$ upon the conductor 16$^a$ being unwound from the reel 15$^a$.

The means 75 is in the nature of an automatic contact or switch means that normally keeps the electrical circuit to the lamp 17$^a$ open, and which automatically completes the circuit to the lamp upon the conductor 16$^a$, or a portion of the conductor, being unwound from the reel 15$^a$. The means 75 includes a stem 32$^a$, projecting from the end of the hub or boss 22$^a$. The stem 32$^a$ is arranged through and is carried by a tubular insulator 76, arranged in an opening 77 in the boss 22$^a$. An electrical supply conduit for conductor 31$^a$ may be connected with the projecting end of the stem 32$^a$. A central axial or longitudinal opening 78 is provided in the reel 15$^a$ in alignment with, or in register with, the opening 77. A tubular insulator 79 is arranged in the opening 78 and carries a screw 80. The end of the stem 32$^a$ may extend into the outer end of the opening 78, and a helical spring 81 is arranged between the adjacent ends of the stem 32$^a$ and the screw 80 to electrically connect the stem and screw.

A radial opening 82 is provided in the reel 15$^a$ to intersect or communicate with the inner end of the opening 78. A contact bar 83 is slidably carried in the opening 82. The opening 82 extends into the conductor-carrying groove 38$^a$ and the outer end of the contact bar 83 is grooved to constitute a continuation of the groove when the bar is in the normal position illustrated in the drawing. A compression spring 84 is arranged under compression between the bottom of the opening 82 and the end of the contact bar 83 to urge the bar outwardly. The conductor 16$^a$, wound on the reel, normally holds the bar 83 in the down or in-position, where it is flush or continuous with the groove 38$^a$. A longitudinal groove 85 is provided in the contact bar 83. The screw 80 is provided with a reduced inner end which extends into the groove 85. The groove 85 is positioned so that the end of the screw 80 extends into the outer end of the groove when the contact bar 83 is in the normal or in-position. A body of insulating material 86 may be arranged in the outer end of the groove 85 to prevent the screw 80 from contacting with the bar when the bar is in its normal position. When the bar 83 shifts to its out-position, upon unwinding of the conductor 16$^a$ from the reel, the inner end of the groove 85 engages or contacts with the screw 80 to electrically connect the bar 83 with the screw.

A longitudinal opening 87 is provided in the reel 15$^a$ to communicate with the radial opening 82 at a point spaced from its outer end. The opening 87 may extend inward from an end of the reel and a tubular insulator 88 may be arranged in the outer portion of the opening. A contact stem 89 is carried by the insulator 88 and extends through the opening 87 to project into a longitudinal groove 90 in the contact bar 83. Insulation 91 may be provided in the outer end of the groove 90. When the bar 83 is in the in or normal position, the end of the stem 89 is disposed in the outer end of the groove 90 at the insulation 91 and, upon the bar 83 shifting to its out position, the inner end of the groove contacts with the stem 89. The conductor 16$^a$ is electrically connected to the outer end of the contact stem 89. A ground wire 71$^a$ is wound on the reel, together with the conductor 16$^a$, and is connected to or grounded to the reel 15$^a$.

When the conductor 16$^a$ and the ground wire 71$^a$ are fully wound on the reel, as illustrated in Fig. 6 of the drawing, the contact bar 83 is held in the depressed position where the screw 80 and the stem 89 are out of electrical engagement with the bar 83. Upon the lamp 17ᵃ being removed from the housing so that the conductor 16ᵃ is unwound from the reel, the spring 84 slides the bar to the out-position where the screw 80 and the stem 89 contact with the bar so that a circuit is completed to the lamp. In the preferred form of the invention, the opening 82 is positioned so that it extends into the groove 38ᵃ at a point adjacent the end from which the conductor is initially passed when the lamp is removed from the housing. In the case illustrated in the drawing, the opening 82 opens into the second convolution of the groove 38ᵃ so that the lamp 17ᵃ may be lighted upon its being moved a short distance from the housing. It will be apparent that any suitable lamp similar to the lamp 17 described above may be employed, or a lamp without a switch may be used if desired, as it is automatically lighted upon being engaged and moved from the housing by the operator.

Having described only typical preferred forms of my invention, I do not wish to limit myself to the specific details set forth, but wish to reserve to myself any changes or variations that may appear to those skilled in the art or that may fall within the scope of the following claims:

Having described my invention, I claim:

1. In a signalling device of the character described, a shell having two divergent sides so spaced and shaped as to be adapted to be held between two extended fingers of a hand and having two spaced opposite end walls extending between said sides, illuminating means in the shell and enclosed by said sides and end wall, and lenses in the said opposite end walls of the shell adapted to project light from the front and rear sides of the hand when the hand is vertical.

2. In a signalling device of the character described, a shell including two divergent sides spaced and shaped so as to be adapted to be held between two fingers of a hand, and two two spaced opposite end walls extending between said sides, illuminating means in the shell and enclosed by said sides and end walls, control means for the illuminating means engageable and operable by one of the fingers between which the shell is held, and lenses in the said opposite end walls of the shell adapted to project light from the front and rear sides of the hand when the hand is vertical.

3. In a signalling device of the character described, a shell including two divergent sides spaced and shaped so as to be adapted to be held between two fingers of a hand, two spaced opposite end walls extending between said sides, and an outer wall connecting the outer ends of said sides, illuminating means enclosed in the shell by said sides and walls, lenses in the said opposite end walls of the shell adapted to project light from the front and rear sides of the hand when the hand is vertical, and a lens in said outer wall of the shell to project light laterally.

EDMUND B. THOMPSON.